United States Patent
Morgen et al.

(10) Patent No.: US 6,871,148 B2
(45) Date of Patent: Mar. 22, 2005

(54) ULTRASONIC SYSTEM AND TECHNIQUE FOR FLUID CHARACTERIZATION

(75) Inventors: Gerald P. Morgen, Kennewick, WA (US); Richard A. Pappas, Richland, WA (US); David M. Pfund, Richland, WA (US); Walter C. Weimer, Richland, WA (US); David M. Sheen, Richland, WA (US); Brion J. Burghard, W. Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 16 days.

(21) Appl. No.: 10/188,493

(22) Filed: Jul. 2, 2002

(65) Prior Publication Data

US 2004/0006436 A1 Jan. 8, 2004

(51) Int. Cl.[7] .............................. G01F 1/00; G01F 7/00; G06F 19/00
(52) U.S. Cl. .............................................. 702/48; 702/6
(58) Field of Search ................... 702/6, 48; 73/152.47, 73/54.41, 861.25; 600/407

(56) References Cited

U.S. PATENT DOCUMENTS

| | | | |
|---|---|---|---|
| 4,141,347 A | 2/1979 | Green et al. | |
| 4,320,659 A | 3/1982 | Lynnworth et al. | |
| 4,476,874 A | 10/1984 | Taenzer et al. | |
| 5,043,706 A | 8/1991 | Oliver | |
| 5,291,892 A | 3/1994 | O'Donnell | |
| 5,437,194 A | 8/1995 | Lynnworth | |
| 5,488,953 A | 2/1996 | Vilkomerson | |
| 5,521,883 A | 5/1996 | Fage et al. | |
| 5,540,230 A | 7/1996 | Vilkomerson | |
| 5,604,301 A | 2/1997 | Mountford et al. | |
| 5,719,329 A | 2/1998 | Jepson et al. | |
| 5,752,519 A | 5/1998 | Benaron et al. | |
| 5,792,962 A | 8/1998 | Constant et al. | |
| 5,947,903 A | 9/1999 | Ohtsuki et al. | |
| 6,025,670 A | 2/2000 | Corl et al. | |
| 6,067,861 A * | 5/2000 | Shekarriz et al. | 73/861.25 |
| 6,158,288 A | 12/2000 | Smith | |
| 6,178,827 B1 | 1/2001 | Feller | |
| 6,186,951 B1 | 2/2001 | Lizzi et al. | |
| 6,209,388 B1 | 4/2001 | Letton et al. | |
| 6,262,942 B1 | 7/2001 | Stanton | |
| 6,378,357 B1 * | 4/2002 | Han et al. | 73/54.41 |
| 2003/0073894 A1 * | 4/2003 | Chiang et al. | 600/407 |
| 2004/0003658 A1 * | 1/2004 | Han et al. | 73/152.47 |

OTHER PUBLICATIONS

"Ultrasonics in the Food Industry: Ultrasonic Rheometer for Non–Invasive, Real–Time Process Control", Pappas, R.A., Bond, L.J., Morgan, G.P., Pfund, D.M., and Sheen, D.M., Jul. 3, 2001.

(List continued on next page.)

*Primary Examiner*—John Barlow
*Assistant Examiner*—Aditya S Bhat
(74) *Attorney, Agent, or Firm*—Woodard, Emhardt, Moriarty, McNett & Henry LLP

(57) ABSTRACT

A pair of multi-frequency ultrasound transducer surround a fluid flow and are configured to operate under computer control in both a mono-static and a bi-static mode at each of the multiple frequencies. In the mono-static mode, pulsed wideband Doppler shift measurements provide the velocity profile across the fluid flow which can be combined with measured pressure drops to determine the rheogram—a plot of shear stress versus shear rate. Velocity profile data from each frequency can be combined to form a composite velocity profile. In the bi-static mode, transmission data is collected that improves the accuracy and robustness of the velocity profile and provides supplemental material property information. The system is configured for automated operation for a wide variety of fluid types and can be reconfigured and/or monitored remotely.

28 Claims, 7 Drawing Sheets

OTHER PUBLICATIONS

"Pulsed Ultrasonic Doppler Blood–Flow Sensing", Baker, Donald W., IEEE Transactions on Sonics and Ultrasonics, vol. SU–17, No. 3, Jul. 1970, pp. 170–185.

"On–Line Slurry Viscosity and Concentration Measurement as a Real–Time Waste Stream Characterization Tool", Powell, Robert L., Shekarriz, Alireza.

"Slurry Pipe Flow Measurements Using Tomographic Ultrasonic Velocimetry and Densitometry", Shekarriz, A., and Sheen, D.M., Proceedings of FEDSM '98 1998 ASME Fluids Engineering Division Summer Meeting, Jun. 21–25, 1998, Washington, D.C.

"Study of Flow Processes of Concentrated Suspensions Using In–Line Non Invasive Rheological Technique," Ouriev, Boris, and Windhab, Erich J., $2^{nd}$ International Symposium on Ultrasonic Doppler Methods for Fluid Mechanics and Fluid Engineering, Sep. 20–22, 1999.

"Ultrasound pulse Doppler method as a viscometer for process monitoring", Th.Wunderlich, P.O. Brunn, Flow Measurement and Instrumentation, 10 (1999) 201–205.

"Optical and acoustic rheometers: three examples", Brunn, P.O., Vorwerst, J., Steger, R., Rheology 93, pp. 20–27.

* cited by examiner

ULTRASONIC SYSTEM AND TECHNIQUE FOR FLUID CHARACTERIZATION

FIELD OF THE INVENTION

The present invention is directed to the field of acoustic fluid property determination. More particularly but not exclusively, the present invention is directed to novel systems and techniques for in situ measurement of process streams utilizing a plurality of ultrasonic measurements at a plurality of distinct frequencies.

BACKGROUND

Fluids are encountered in a variety of industrial applications and include, for example, gasses, liquids, slurries, pastes, sludges, and combinations thereof. There is a continual need to determine properties of those fluids for purposes of process monitoring, process optimization, and/or process control. Moreover, it is desirable to be able to measure such fluid properties rapidly and in a non-invasive manner, and the use of acoustic sensors provide advantages in this regard. Unfortunately the ability to rapidly, reliably, and efficiently determine fluid properties over a wide range and/or for a variety of fluid types with a single ultrasound based system has been limited. Thus, there is an ongoing need for further contributions in this area of technology.

SUMMARY

One embodiment of the present invention is a fluid interrogation technique. Other embodiments include unique apparatus, systems, and methods for characterizing fluids.

In one form, the invention provides a novel system including a multi-frequency ultrasound transducer pair surrounding a fluid flow configured to operate under computer control in both a mono-static and a bi-static mode at each of the multiple frequencies. In the mono-static mode, Doppler shift measurements of scattered ultrasound provide the velocity profile across the fluid flow. Information from the velocity profiles are combined with measured pressure drops to determine the rheogram—a plot of shear stress versus shear rate. In the bi-static mode, data is collected that improves the accuracy and robustness of the velocity profile and provides supplemental material property information. The system is configured for automated operation for a wide variety of fluid types and can be reconfigured and/or monitored remotely. The system can operate under an interal or an external trigger. With an internal trigger, the system substantially continuously monitors the flow to provide average flow data. With an external trigger, the system provides instantaneous flow information for a varying flow pattern.

Another embodiment is a method that includes determining the physical properties of a fluid by ultrasonic interrogation of the fluid at a plurality of distinct frequencies to determine a composite velocity profile for the fluid as it is flowing in a conduit. The composite velocity profile is formed by measuring reflection mode pulsed wideband Doppler shifts at first and second different ultrasonic frequencies, selecting a first portion of the first reflection mode pulsed wideband Doppler having a determined signal to noise ratio less than a predetermined level at a range less than the full diameter of the conduit, and forming the composite velocity profile for the fluid flow from the selected first portion of the first Doppler and a portion of the second Doppler. In a further aspect, the viscosity of the fluid is then determined from the composite velocity profile and a measured pressure drop in the conduit.

In a refinement to the above or in another embodiment, additional ultrasonic measurements of a flowing fluid are performed in connection with the ultrasonic formation of a velocity profile. The additional measurements are performed at the different ultrasonic frequencies to provide additional information about the fluid stream. This additional ultrasonic data, for example attenuation and time-of flight data, can be utilized in combination with the velocity profile data to improve the accuracy and robustness of the velocity profile and/or to provide supplemental material property information concerning the fluid flowing in the pipe. Particular applications include the determination of shear rate or shear stress, the detection of the interface between sequential distinct fluids flowing in the conduit, the monitoring of changes in solids loading for a solids-containing fluid, the monitoring of the residence time of solids in a solids containing flow, and/or the detection of fouling or wall deposits. In a further refinement, the multiple types of ultrasonic measurements are performed with common ultrasonic interrogation devices associated with a process stream and coupled to a processing device operable to automatically reconfigure the interrogation devices to perform different measurement protocols in response to changes in the detected properties of the interrogated fluid.

In yet another embodiment, ultrasonic measurements are performed with a device that includes a communications link, for example an Ethernet port, and the device can be configured and maintained both locally and remotely via the communications link. In one embodiment, the invention provides a device that can be used on a large variety of products, including complex fluids and highly attenuating product streams, such as dense liquids, liquid-solid mixtures, slurries or pastes. Examples of such products include tomato paste and other food products, shampoo and other consumer products, and polymer process streams.

Accordingly, one object of the present invention is to provide a unique fluid measurement technique.

Another object is to provide a unique apparatus, system, device, or method for determining fluid properties.

Further objects, embodiments, forms, features, aspects, benefits, and advantages of the present invention will become apparent from the drawings and detailed description contained herein.

DESCRIPTION OF EMBODIMENTS

Figure 1:
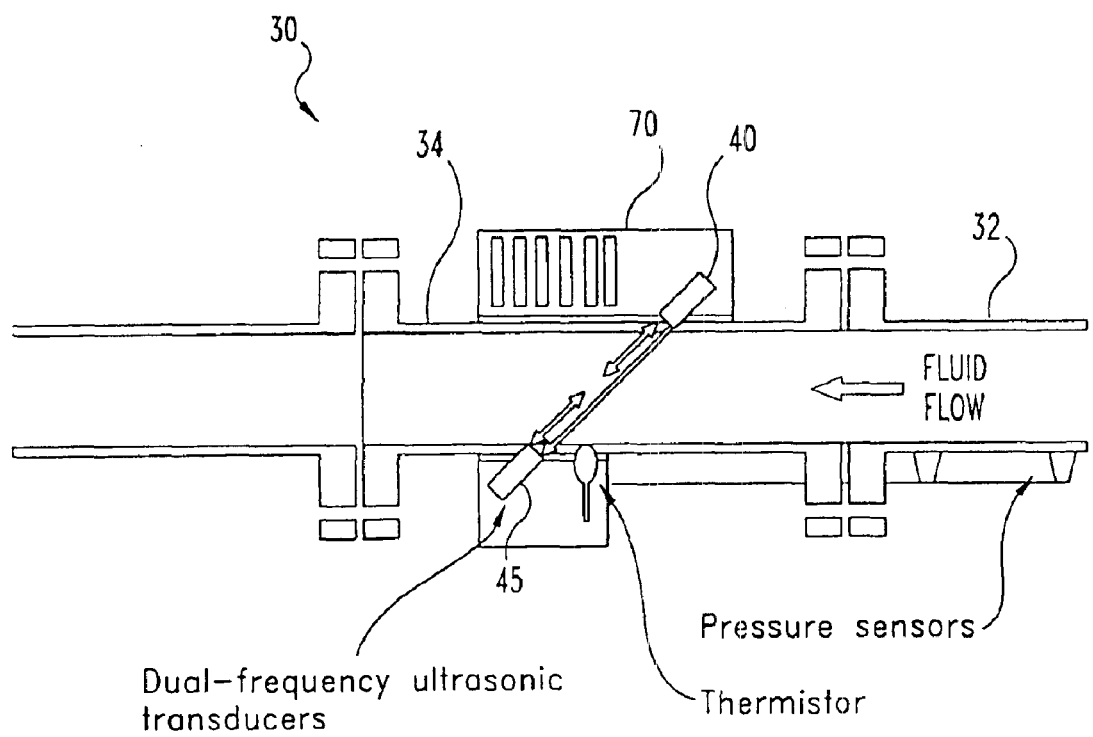
FIG. 1 is a schematic illustration of an ultrasonic system for determining fluid properties.

For the purposes of promoting an understanding of the principles of the invention reference will now be made to the embodiments illustrated in the drawings and specific language will be used to describe the same. It will nevertheless be understood that no limitation of the scope of the invention is thereby intended. Any alterations and further modifications in the illustrated embodiments, and any further applications of the principles of the invention as illustrated herein are contemplated as would normally occur to one skilled in the art to which the invention relates.

Referring to FIG. 1, a fluid interrogation system 30 is illustrated. System 30 includes a pair of dual frequency transducers 40, 45 on opposing sides of a fluid flowing through a process pipeline 32. The transducers 40, 45 are oriented facing each other at approximately a 45 degree angle to the flow direction. The transducers 40, 45 are coupled to the pipeline 32 as a spool piece 34 suitable for industrial plant operation, being manufactured of, for example, 316 stainless steel or polysufone plastic. The spool piece has a continuous inside diameter surface, and to be compatible with food processing and safety and health constraints, the transducer elements are acoustically coupled to the interior fluid flow without penetration of the inside diameter of the spool piece.

Figure 2:
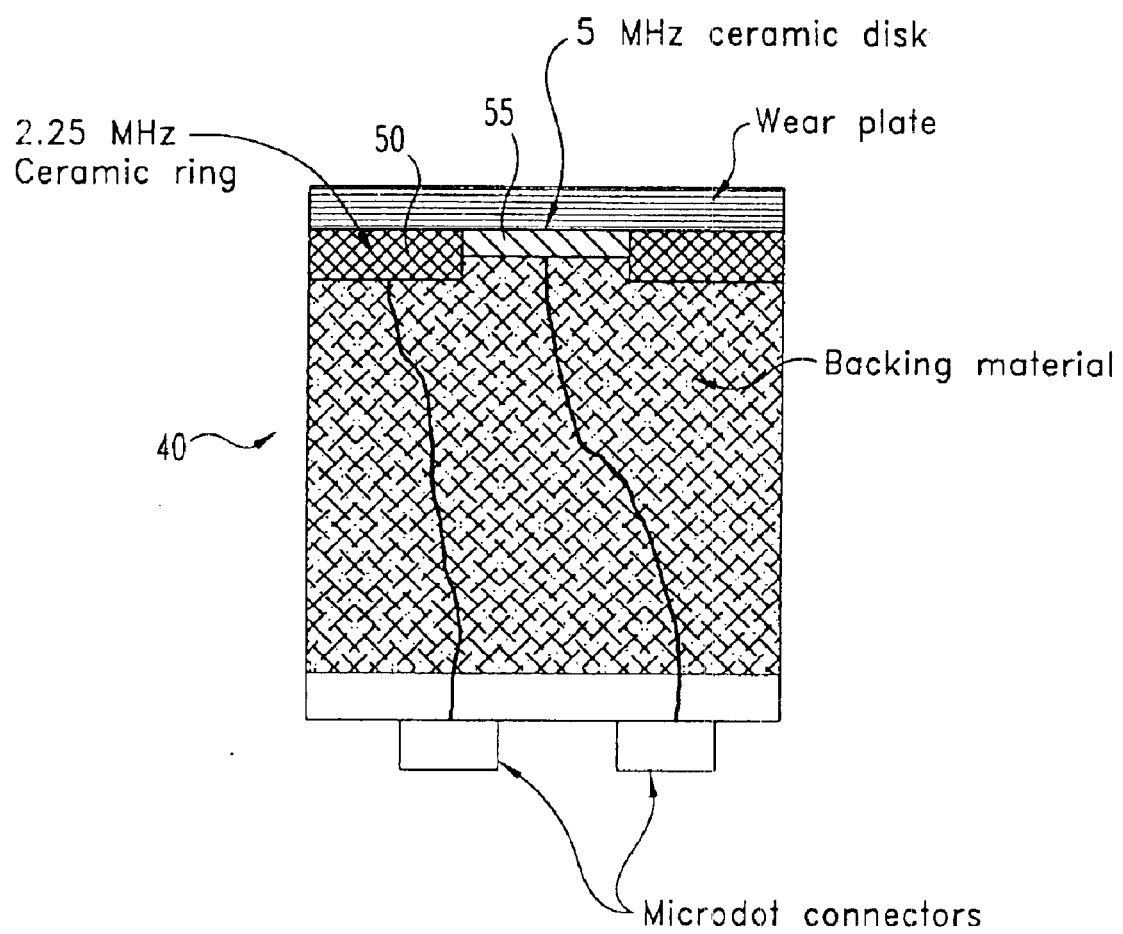
FIG. 2 is a schematic illustration of a dual frequency transducer for the FIG. 1 system.

Referring now to FIG. 2 the dual frequency transducers 40, 45 have two distinct ceramic transducer elements 50, 55 for transmitting and receiving ultrasound at first and second different ultrasonic frequencies f1 and f2, respectively. The frequencies f1 and f2 can be selected to be any useful value depending on the particular application. A typical range for the frequencies f1, f2 is between about 0.5 MHz and 5 MH, for example f1 equal to 2.25 and f2 equal to 5 MHz. The two transducer elements 50, 55 are concentric and axially symmetric (a disc and ring configuration) and are contained in a common housing to facilitate alignment in a single step. Elements 50, 55 have individual signal lines but share a common wear plate and backing material. The higher frequency transducer element 55 is selected as the inner element to match the divergence properties at the two frequencies to more closely assume that each element is sampling the same volume. Arrangements other than concentric transducer elements, such as side-by-side or physically separated transducer elements, could also be employed with the understanding that each transducer element is to be aligned with the opposing transducer element of like frequency.

Figure 3:
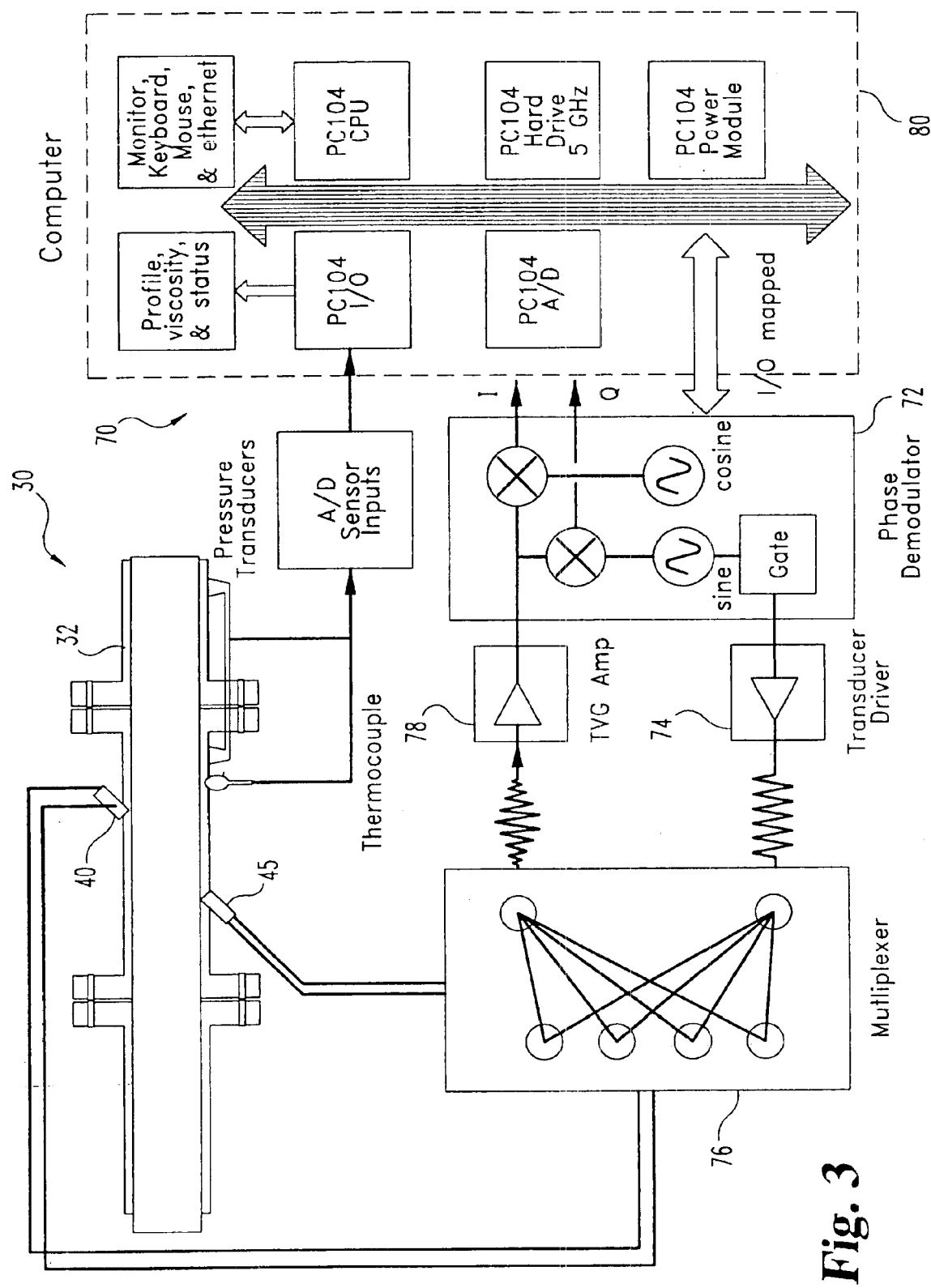
FIG. 3 is a schematic illustration showing additional details of the FIG. 1 system.

Turning now to FIG. 3, the transducers 40, 45 are coupled to a computer system 70 which controls the operation of the transducers and collects and processes the signals from the transducers as well as signals from a pair of pressure sensors and a temperature sensor. Computer system 70 is operable to select the mode of operation (through transmission or backscattering) and the frequency of operation, f1 or f2. A phase demodulator 72 generates the electrical signals that are amplified in a transducer driver 74 and sent to a selected one of the elements 50, 55 of one of the transducers 40, 45 via a multiplexer 76. The response from the selected like frequency transducer element 50, 55 of transducer 40 or 45 (depending on the selected mode of operation) is multiplexed through a programmable time variable gain (TVG) 78, and after demodulation is A/D converted and passed to a processing and controlling computer 80. The time variable gain 78 is linear with both the slope and baseline adjustable parameters. The gain parameters are adjusted based on measured transmission (or reflection) amplitudes to account for changes in fluid properties, for example changes in attenuation of the fluid being interrogated. Computer 80 is a pc 104 based computer which is programmed to extract fluid property information from the digitized signals according to a preset interrogation routine saved in memory or in response to specific requests received either locally or remotely via an ethernet connection.

One aspect of the invention involves performing time of fight measurements in both an upstream and downstream direction (at one or both frequencies) to infer the local speed of sound and the average flow rate of the fluid given the know spatial location of the transducers 40, 45. The local speed of sound can be correlated with concentration information (for example solids concentration in a slurry) through a one-time off line calibration. Attenuation data can also be collected to infer concentration information. Speed of sound and attenuation data can be periodically or substantially continuously monitored to detect changes in properties of the flowing fluid. One useful application is in detecting what type of fluid is flowing in a particular section of pipe, or the interface between two fluids, when different fluids flow sequentially through a pipeline. Sequential flow of different fluids is common in clean in place procedures where a cleaning fluid is periodically introduced into a pipe to clean a particular section of the pipeline and the original process fluid then must be used to pump out the remaining cleaning fluid prior to resuming normal operations.

Another aspect involves determining fluid velocity profile utilizing the Doppler effect. Fluid velocity profile measurement according to this aspect relies on measurement of the Doppler frequency shift of moving tracer particles, or scatterers, within a pipe flow. The particles, or scatterers, can be both natural/inherent to the flowing material and introduced intentionally to the flow for the explicit purpose of making the ultrasonic Doppler measurement. The term scatterer refers to any feature within the fluid that exhibits a change in the acoustic impedance through that feature. The acoustic impedance is the product of the density and speed of sound. The speed of sound is, in turn, related to the density and compressibility of the material. Often a change in density and/or compressibility defines the scatterer, for example a particle. A change in density and/or compressibility may also be the result of fluid density variations resulting from a temperature gradient, concentration gradient or other gradient. Using a short ultrasonic pulse system, the cross-sectional velocity profile is obtained from the Doppler shift at each point in a range. The Doppler frequency shift, $f_D$, is given by $$f_D = \frac{2v}{c} f \quad (1)$$

where v is the fluid/particle velocity, c is the speed of sound in the medium, and f is the ultrasonic frequency. For example, the Doppler shift is 6.67 kHz for a particle moving with velocity of 1 m/sec in water with speed of sound equal to 1500 m/sec and an ultrasonic frequency of 5 MHz.

For purposes of range resolution, a short ultrasonic pulse is transmitted. In one aspect this short pulse is a wide bandwidth coherent burst signal. This burst signal is of a predetermined number of cycles, typically 4–20 cycles in length. The range resolution is approximately equal to one-half of the spatial width of the pulse. Accordingly, for N sine-wave cycles of wavelength λ, the range resolution is approximately Nλ/2. For example, 5 cycles of 5 MHz (0.3 mm wavelength) yields a range resolution of approximately 0.75 mm. Obtaining such high range resolution creates a problem for measurement of the Doppler shift which is on the order of kilohertz. A gated sine-wave of only a few cycles has a relatively wide frequency bandwidth B approximately equal to f/N, which is 1 MHz for 5 cycles of a 5 MHz wave. The Doppler shift would need to be on the order of or larger than 1 MHz to be distinctly measurable from the frequency spectrum of the echo returned from the particles.

Doppler shifts this large would only be expected if the fluid velocity were on the same order as the speed of sound in the fluid. Velocities of interest in pipe flow problems are much lower than the speed of sound. While reducing the bandwidth would allow for good Doppler velocity resolution it would yield a poor range-resolution.

This conflict is resolved according to the present invention by transmitting and receiving multiple pulses, i.e. observing the fluid over a much longer time interval and obtaining a greater number of observations (waveform captures) from each point in the flow field. While there are no minimum or maximum number of pulses that may be used, a useful range for the number of pulses is from 2 to 4096 pulses. In one aspect, these multiple pulses are transmitted and received at a fixed pulse repetition frequency (PRF) adjustable up to about 5,000 Hz, where the captured data provides a series of fast time traces for a subsequent transform between the frequency and time domains.

When operating in the Doppler mode, the ultrasonic transceiver generates a specified number of cycles (for example 1–15 cycles) of ultrasound, then amplifies and transmits them through the one of the transducer element of one of the transducers, for example element 55 of transducer 40. The same transducer element is used to receive the echoes from the fluid scatterers. The received echo signals are passed through a low noise amplifier chain (within a transceiver) with time variable gain adjustable to 99 dB. This is a linear time variable gain (TVG) with both the baseline value and the slope fixed based on previous amplitude measurements. After amplification the received signals are coherently down converted in frequency from the transducer frequency (i.e. f1 or f2) to baseband (centered at DC). Frequency downconversion allows a much smaller amount of data to be recorded by the A/D converter than would direct A/D sampling. The computer interface electronics generate the sampling clock pulses used by the A/D converter. The number of pulses is adjustable, as is the time delay to the first sample. After A/D conversion the data is stored in memory, for example on a disk-drive within the computer. Preferred parameters used in this system are shown in Table 1.

TABLE 1

The Ultrasonic Doppler System Parameters.
Data collection parameters

| | |
|---|---|
| Frequency | 5 MHz, 2.5 MHz |
| Number of cycles | 5 |
| Range resolution | 0.75 mm |
| Range samples | 512 |
| Slow-time samples | 1024 |
| Time per waveform | 0.5 msec |
| Total data collection time | 0.512 sec |

An instruction set within the computer receives data from the Doppler measurement and determines an appropriate fluid velocity profile along the line-of-sight between the transducers using the speed of sound in the fluid, c, stored in memory. The Doppler data is down-converted then read in a time series format by the computer. An initial range or "fast-time" is selected from which to extract a slow-time waveform. A Fourier transform is performed along the slow time from which is obtained the magnitude and the mean velocity at that initial range. This process is repeated until all ranges have been assigned a fluid velocity. The fluid velocity data may be further processed such that a single velocity value for each range is provided, for example by representing the velocity data as a probability density function and selecting the peak of the distribution as the local velocity. In this manner, a fluid velocity profile is obtained utilizing one of the transducers operating at one of the frequencies. Averaging across a running total of a number of velocity profile data sets, for example 1–16 profiles, can also be employed.

Because there are two transducers 40, 45 each having two operating frequencies, selection of the transducer and the operating frequency provides the opportunity to obtain up to four differently derived velocity profiles of the same flow, one per transducer per frequency. Absent a reason to suspect one would be more reliable than the other, averaging among the differently derived profiles can be employed, for example to achieve a composite profile representing an arithmetic mean velocity profile. At each of the different interrogation frequencies and for each of the transducers, the velocity profile could also be achieved by the system and technique described in commonly owned U.S. Pat. No. 6,067,861 to Shekarriz et al which is hereby incorporated by reference.

A challenge to the accurate determination of the velocity profile is attenuation of ultrasound by the fluid material. For typical pipe diameters, the ultrasonic attenuation found at some frequencies in certain fluids limits the ultrasonic pulse penetration to the point where a complete velocity profile cannot be acquired. For example highly viscous fluids and highly heterogeneous fluids such as slurries and sludges may exhibit significant attenuation. Such fluids are also typically non-Newtonian fluids. These and other fluids that frustrate ultrasonic penetration are common to many food and consumer products and include, by way of example, shampoo, chocolate, tomato paste, peanut butter, mustard, steak sauce, batters, and mashed potatoes. Ultrasonic beam spread, scattering from particles, and absorption mechanisms all contribute to the attenuation of an ultrasonic pulse propagating through a liquid. Attenuation from particle scattering depends on the size of the particles relative to the wavelength of sound in the material and on the particle composition, shape, and concentration. Absorption mechanisms contributing to attenuation include viscosity, thermal conduction, and molecular relaxations.

The Doppler measurement requires some degree of scattering from particles in the flow stream. However, severe scattering, from large concentrations of bubbles for example, has a deleterious effect. The use of a lower frequencies will generally improve the penetration but presents a compromise between minimizing absorption effects for improved penetration and maintaining the scattering response required for the Doppler measurement. Because a lower operating frequency adversely impacts the spatial resolution, data obtained at lower frequencies can be less useful in certain applications.

The present invention overcomes the problems of attenuation at higher frequencies and lower resolution at lower frequencies by including a dual-element transducer for measuring at two frequencies from two locations at opposite sides of the pipe. The lower frequency Doppler data provides improved penetration at the expense of spatial resolution. The higher frequency data provides the better resolution but can suffer degraded signal-to-noise performance for the more attenuating materials that precludes the collection of useful data at all spatial locations.

As described above, Doppler data are obtained with each of the transducers operating at each of the frequencies. In one mode of operation a composite velocity profile is then created from Doppler data collected at both frequencies. The composite profile can be formed by truncating the one set of velocity profile data (the high frequency data) and supplementing the truncated data with the data from another frequency (lower frequency) or transducer. The truncation point within a data set can be defined by calculating a signal to noise metric of the Doppler amplitudes and truncating if the signal to noise metric falls below a predetermined limit. Any suitable signal to noise metric can be employed, for example comparison of the Doppler amplitudes to the root mean squared (RMS) signal amplitude and truncating if the ratio falls below 2:1. Using both the higher- and lower-frequency Doppler data provides increased penetration and high resolution. The redundancy of two dual-frequency probes provides additional sampling of near-wall regions of flow that can help alleviate errors in the near-wall velocity measurements.

Figure 5:
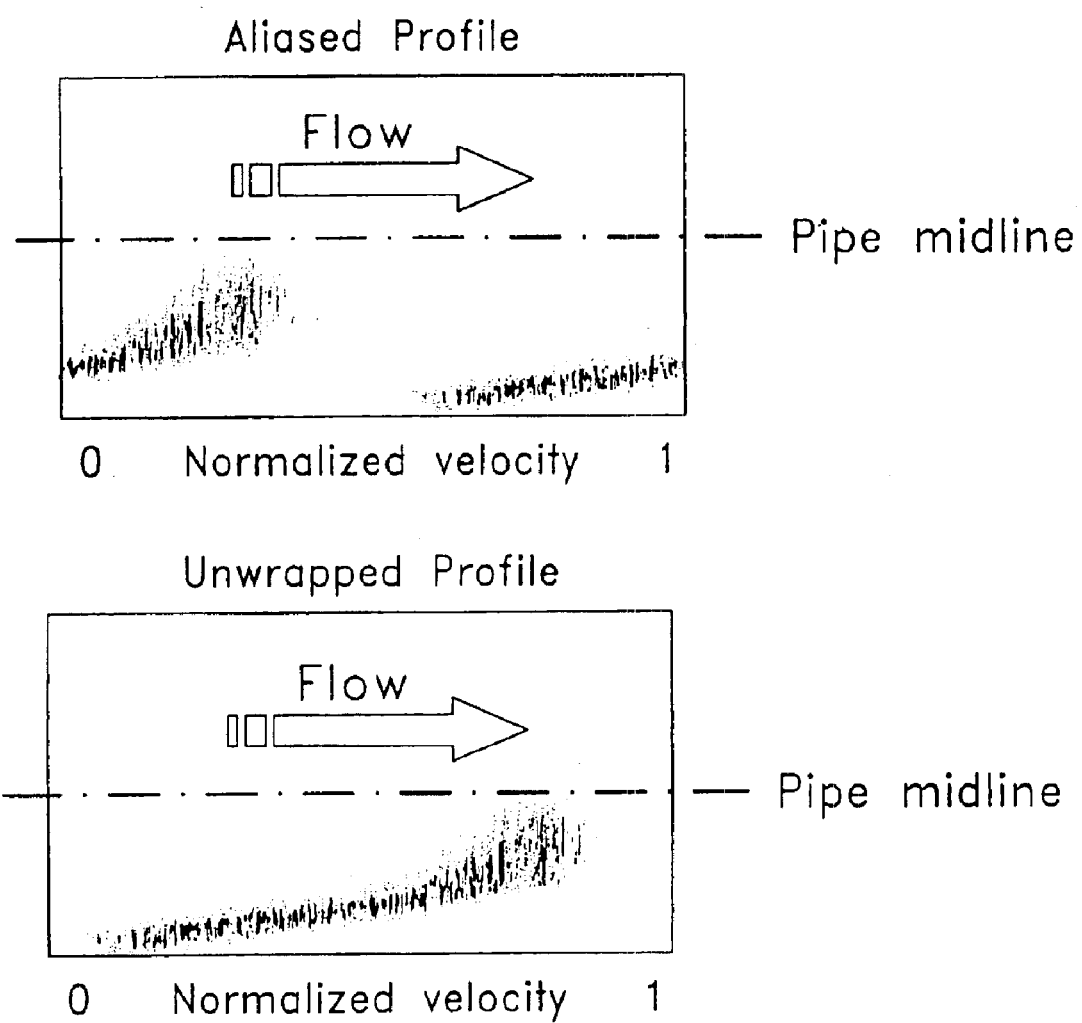
FIG. 5 is an exemplary plots of aliased and the corresponding unwrapped plot of normalized velocity profile data versus radial position in a pipe.

Unfortunately, at higher flow rates, incorrect velocity measurements can occur due to aliasing, an artifact of extracting the particle velocity from the Doppler shifted backscattered ultrasonic echo. The aliasing artifact arises when the Doppler-induced frequency shift exceeds one half the instrument's pulse repetition rate (PRF) and, as illustrated in FIG. 5, manifests itself as a fragmented fluid velocity profile. This is the Nyquist limitation associated with the discreet sampling of the Doppler frequency. Increasing the PRF is one method of avoiding aliasing, though, as described below, there is a practical upper limit to the PRF. To further extend operation to include those situations where aliasing may occur, the present invention includes means to detect the onset of aliasing in the collected Doppler data and to extract accurate velocity data from an aliased Doppler velocity profile. The un-aliasing technique is robust and allows the system to be used at flow rates commonly encountered in industrial applications, for example in the manufacture of food and consumer products.

In one mode of operation, as the flow rate increases, the PRF can be increased to avoid aliasing. However, the PRF cannot be increased indefinitely, as the PRF is limited by the round-trip time required for the ultrasonic pulse to travel the full-width of the pipe, given as 2L/c, where L is the one-way distance across the pipe and c is the speed of the ultrasound in the fluid (a fluid specific value). Typically $L=\sqrt{2}D$ for 45 degree incidence with pipe diameter D. Together with the Nyquist limitation discussed above, this pulse travel time limits the velocity range that can be directly measured with a UDV system without aliasing. Letting $\Delta t=1/PRF$ equal the Pulse Repetition Interval (PRI), then $$\frac{2L}{c} \le \Delta t \le \frac{1}{2f_D} \quad (2)$$

or $$\frac{2L}{c} \le \Delta t \le \frac{c}{4vf} \quad (3)$$

where L is the one-way distance across the pipe.

The maximum fluid velocity limit is achieved when $$\frac{2L}{c} = \frac{c}{4v_{max}f} \quad (4)$$

or $$v_{max} = \frac{c^2}{8Lf} \quad (5)$$

For a 10 cm diameter pipe at 45 degrees ($L=\sqrt{2}\times0.10$), f=5 MHz, and c=1500 m/s (water), the maximum fluid velocity is $v_{max}=0.4$ m/s. Decreasing the frequency to 2.5 MHz increased $v_{max}$ to 0.8 m/s.

The maximum fluid velocity can be increased if the flow is assumed to be unidirectional when performing the transform to extract the velocity data from the Doppler echo data. In this case, the sampling limit is one complex sample per Doppler period. This results in $$v_{max} = \frac{c^2}{4Lf} \quad (6)$$

which doubles the bi-directional maximum fluid velocity. For the conditions above, $v_{max}=0.8$ m/s at 5 MHz, and $v_{max}=1.6$ m/s at 2.5 MHz.

If the actual fluid velocity exceeds this maximum level, then the system will still provide information about the velocity profile, however, it will ambiguous due to aliasing. Accordingly in another mode of operation, aliasing is detected by searching for discontinuities in the collected velocity profile data. The searching can be by numerical processing in the computer. Once detected, these discontinuities define fragmentation boundaries of the profile. The velocity profile data can then be "unwrapped" to reveal the true velocity profile. The true velocity profile is obtained from an aliased profile by using knowledge that the expected velocity profile will be zero at the pipe walls and increase monotonically towards the center. With this assumed knowledge, the true profile is unwrapped by adding an offset value to the velocity values in the range defined by the fragmentation boundaries. The offset value is fixed by the system parameters and corresponds to $v_{max}$ discussed above. Accordingly, in the un-aliasing technique, an offest value, $v_{max}$, is added to the measured profile each time the profile wraps from $v_{max}$ around to zero. There are several options for determining the offset value. One option utilizes the Doppler measured velocity immediately prior to the detected discontinuity in the Doppler data, in other words, the Doppler determined velocity value at the fragmentation boundary. In other variations, the offset value to be added is $v_{max}$ calculated according to equations 5 or 6, as appropriate. It is to be understood that the selection of either the unidirectional or bi-directional calculated $v_{max}$ depends on the manner of extracting the velocity data from the captured waveforms, i.e. whether or not uni-direction flow was assumed in the Fourier transformation. In calculating $v_{max}$ the value for the local speed of sound, c, is determined from the time-of-flight measurements and saved in the computer.

Data from the time-of-flight measurements (also known as transit time measurements) may be used verify the accuracy of the velocity profile reconstruction. In this aspect, the system is operated in bistatic mode to measure the ultrasonic transit times in both directions. An average fluid flow rate is then calculated in conventional fashion from the bi-directional transit times and the known geometry of the transducers relative to the flow direction. This average flow rate is then compared to the average flow rate from the reconstructed velocity profile, which later flow rate is determined by integration of the area under the velocity profile curve. Agreement of these two average flow rates determined via alternate ultrasonic methods within a predetermined margin of error provides a means to verify the accuracy of the unwrapping.

In other aspects, a comparison between the average flow rates determined by the two types of ultrasonic measurements (time-of-flight and Doppler shift) may be expected to differ, for example due to inherent properties of the fluid or the flow pattern. In this aspect the difference is not used to verify the accuracy of the unwrapping. Rather, the difference between the average flow rates determined by the two different ultrasonic methods is used to provide an indication of a characteristic of the fluid flow. One useful application is in determining the residence time of solids in a solid liquid flow.

The mean flow rate derived from the ultrasonic time-of-flight (TOF) measurements represents the average of the liquid phase flow rate and the solids phase flow rate. By contrast, because the Doppler-derived mean flow rate (calculated as the integral of the Doppler-derived velocity profile) relies on scattering from the flow stream, with the acoustic impedance differences caused by solid particles typically resulting in the solid particles being good scatterers, the Doppler-derived flow rate is more indicative of the solids flow rate. The TOF-derived mean flow rate can thus be compared to the Doppler-derive mean flow rate to yield a measure of the difference between the solids flow rate and the overall average flow rate. For fluid systems with primarily smaller particulates that move at the same velocity as the surrounding fluid, differences between these two mean flow rates will be related only to measurement errors. For fluid systems with larger particulates that travel at velocities different than the surrounding fluid, the two mean flow rates can differ significantly.

In other aspect, the multi-frequency Doppler can be operated to extract a velocity distribution for a range of particulate sizes from a specific region of the pipe. The Doppler-derived velocity profile relies on echoes scattered from particulates in the flow stream, where the scattering amplitude is a function of the frequency of the ultrasonic wave. For a given frequency, with a wavelength comparable to the particle size, the scattered echo amplitude will be proportional to the particle size. Conversely, for a given particle size, the scatter echo amplitude will be related to frequency for the range of frequencies where the wavelength is comparable to the particle size. Accordingly, Doppler-derived profiles can be built that preferentially represent scattering from a range of particle sizes. This is accomplished by selecting one or more of the ultrasonic frequency (ies) and filtering the scattering signals by amplitude thresholding, correlating like amplitude scatterers with like particle sizes.

Knowledge about the residence time of solids in a solids containing flow is important for a variety of reasons. For example, in the aseptic processing and packaging of food products, sterility is often maintained at the expense of product quality. The reason for this is that at both the heating and holding stages of a continuous process line, the product temperature is maintained for a specific duration, which duration is the residence time of the flow at that stage. If differences in residence time between the liquid phase and the solids phase are expected but are not accurately determined, assumptions must be made which can result in excessive heating of one phase or the other thereby degrading product quality. The problems are increased for solid-liquid phase fluid streams as the solid and liquid components exhibit increasingly different thermal properties and flow behavior, which is common in the food processing area. The complexity of this issue is revealed in a large body of studies that includes the suggestion that the heat-treatment performance of individual pieces of equipment must be empirically validated.

Accordingly, one contemplated use of the present invention is to continuously and non-invasively monitor the complex flow of a solid-liquid mixture, and particularly solid-liquid food mixtures, and extract to information related to the residence time distribution (or passage time distribution) by comparing the Doppler-derived velocity profile to the mean flow rate extracted from the time-of-flight measurements. The invention can also provide a continuous measure of both the fastest moving solid particulates in the center of the pipe and the slower moving particulates near the pipe wall is most helpful to the processor.

Having accurately determined the velocity distribution through the fluid flow, additional processing can be performed to determine the rheology of the fluid. Rheology describes the relation between the strain or rate of strain field and the stress field. In simple flows, viscosity is a single parameter that links the rate of shear and the shear stress in the flow field. However, most real, industrial fluids, and particularly where the fluids are multi-phase and complex (solid-liquid dispersions and suspensions), the viscosity cannot be represented in terms of a single parameter and becomes a function of the flow field. It is well known that in a solid-liquid slurry, the local fluid viscosity not only depends on the local concentration of the solids but also on the local rate of shear and its gradient. Often, the solids being transported in the pipeline migrate away from the solid walls and into the core of the flow. As a result, measurement of rheology of the fluid near the wall will yield erroneous results relative to the total flow cross section.

Rheological characterization of solid-liquid dispersions is commonly performed using off-line measurement devices. This approach has the disadvantage that once a sample is withdrawn from the process stream its rheological properties will begin to change. Most often, the fluids to be characterized have rheologies that intimately depend on the flow field. This dependence is especially true for colloidal suspensions in which size and fractal dimensions of the clusters or aggregates depend strongly on the environment under which they exist. Many of these fluids exhibit shear-dependent viscosity (non-Newtonian behavior), in the form of shear thinning or shear-thickening behavior, requiring determination of their viscosity at various shear-rates which correspond to the range of shear rates observed in the flow field. Off-line measurements can hardly reproduce the same conditions that exist in a real flow field such as shear induced migration of solid particles. Further, given that the material in the pipeline may not be homogeneous, it will be difficult to obtain a representative sample for off-line measurements.

Non-invasive measurements of the shear rates at specific shear stresses for the non-Newtonian fluids of a process stream can be invaluable in the monitoring and control of product quality. The shear rate curve is the derivative of the velocity profile and is determined from it by a curve fitting procedure. For laminar flows, the shear stress varies linearly, from zero at the centerline of the pipe to a value at the wall that is given by the pressure drop. Accurate velocity profile measurements and robust curve fits facilitate reconstruction of an accurate rheogram.

In a further aspect of the invention, the velocity profiles are fitted and shear rates calculated using a robust curve fitting routine. The shear rate versus radial position is approximated as a cubic spline on a set of equally spaced knots $\{r_1, \ldots, r_{N-1}\}$. That is, the shear rate is approximated as a cubic function between the knot locations, with the stipulations that the functions and their first and second derivatives are continuous at the knots. This procedure is analogous to the process a drafter uses to construct a graph between a few known points with the aid of a flexible spline.

Using a cubic spline makes no assumptions about the physical nature of the shear rate curve (or of the velocity profile), aside from the reasonable continuity conditions that are applied at the chosen knots. The set of all possible cubic spline functions on a given set of knots is a vector space, so the particular spline we were searching for can be represented as a linear combination $$\dot{\gamma}(r) = \sum_{j=0}^{N} \alpha_j \varphi_j(r), \quad (7)$$

where r was the reduced distance from the centerline r/R, R being the radius of the pipe, the $\phi_j$, are cubic b-spline basis functions and the $\alpha_j$ are coefficients estimated from the velocity data by multi-linear regression. This approach has several advantages. It is relatively insensitive to poor data near the pipe walls. There is no need to impose the no-slip boundary condition on the fit of the velocity. The localized nature of the cubic spline localizes uncertainty to regions with poor data. It is not necessary to assume a particular rheology as the fit can represent Newtonian, Bingham plastic, pseudoplastic, or dilatant behavior. Prior knowledge of the rheology can optionally be used in a graduated manner to slightly smooth, or to completely constrain the curve fit.

In various modes of operation, system 30 can be used to determine a variety of parameters useful in fluid processing applications. For example system 30 can be used to determine a shear rate at a specific shear stress and/or position across the flow, for example the center, or near wall regions, or the shear stress at plug flow transition, the yield stress. System 30 can be used to detect the composition interface (transition between sequential fluids) by monitoring the speed of sound at the different frequencies. System 30 can be used to monitor changes in solids loading by monitoring the transmission signal amplitude (attenuation) or determined speed of sound. System 30 can also be used for detection of fouling in pipe walls or wall deposits. Fouling or wall deposits are detected as zero flow in the near wall regions (narrowing of the velocity profile).

Figure 4A:
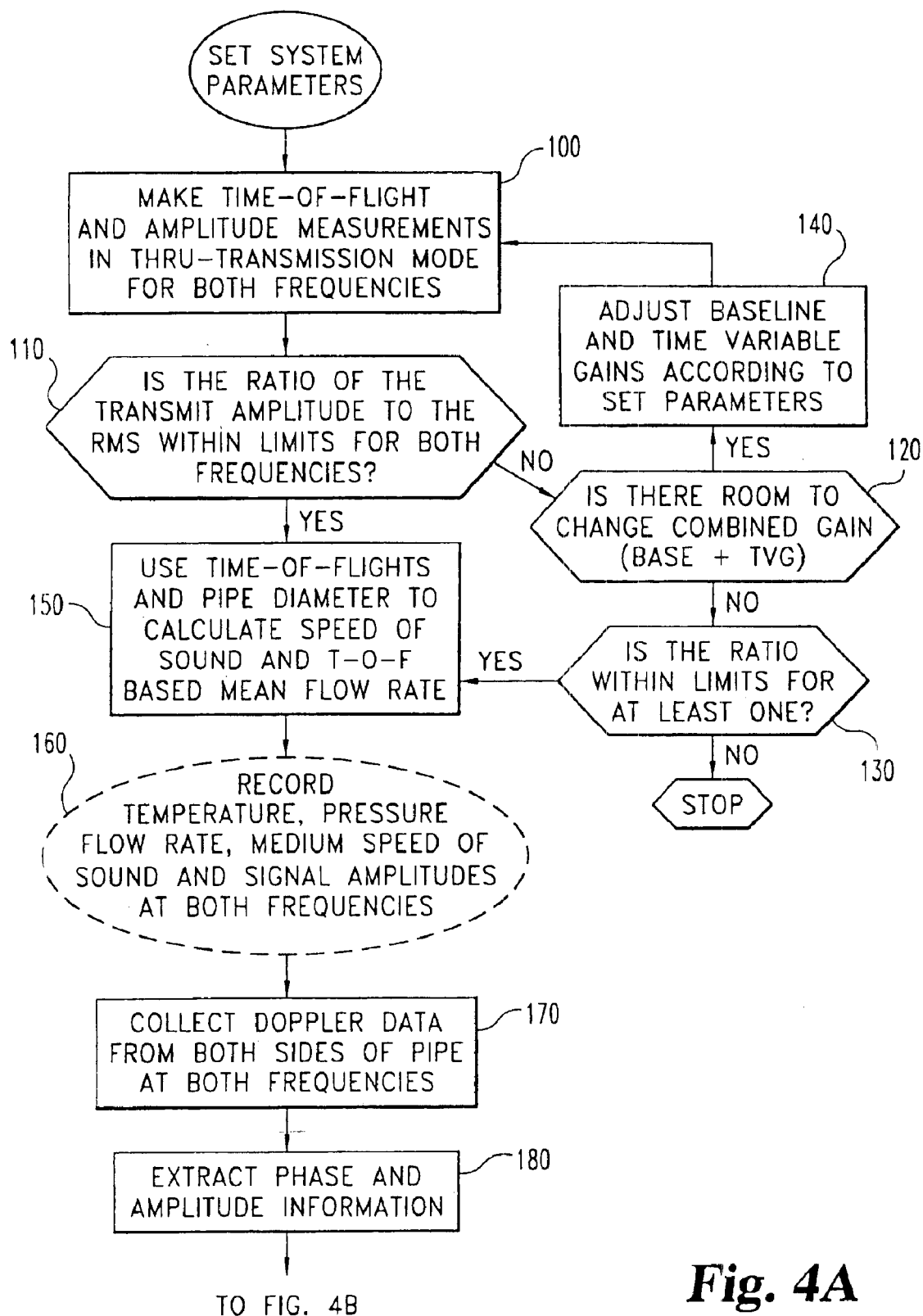
FIGS. 4A–C is a flowchart of a method according to an embodiment of the invention.
Figure 4B:
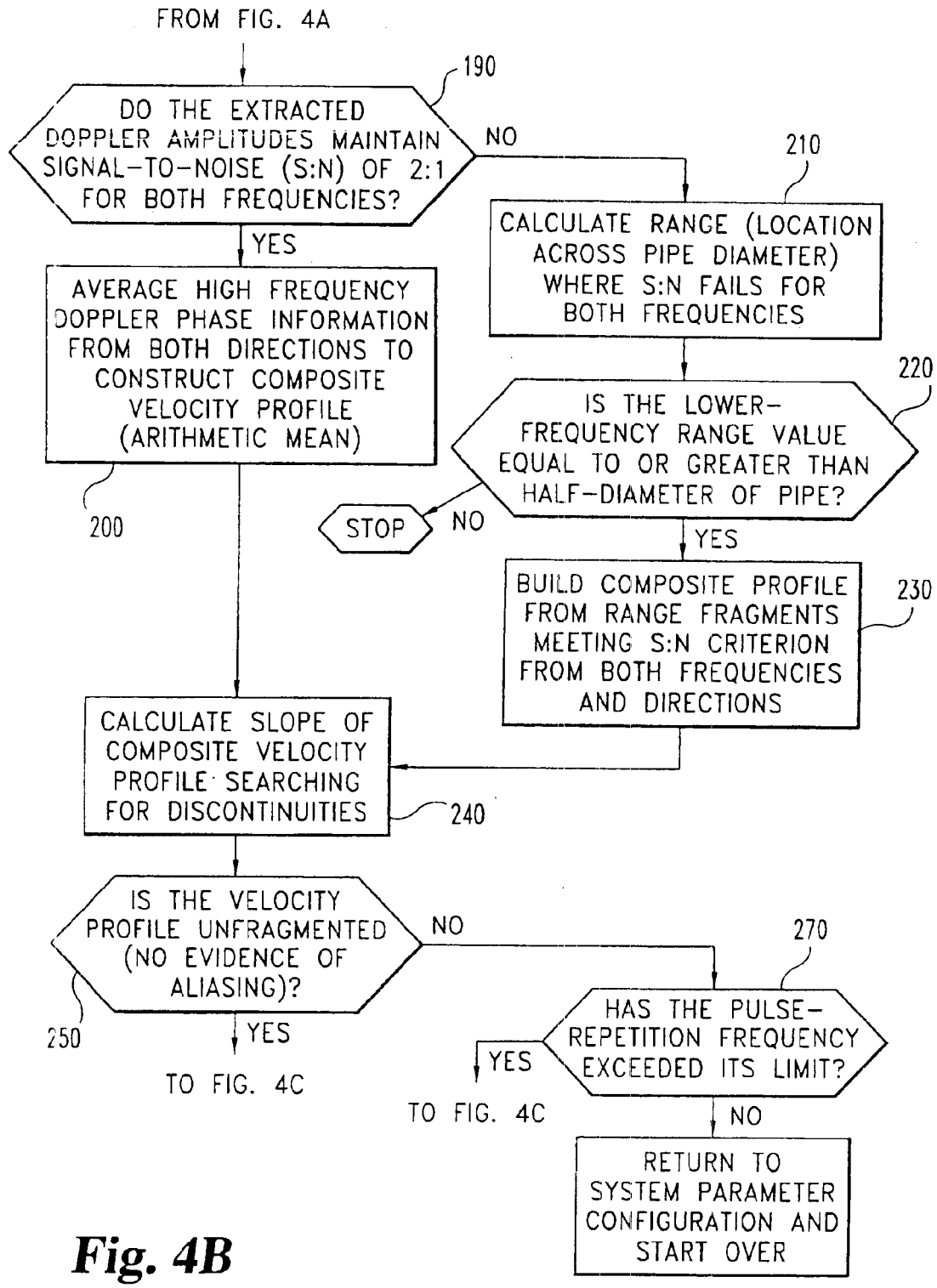
Figure 4C:
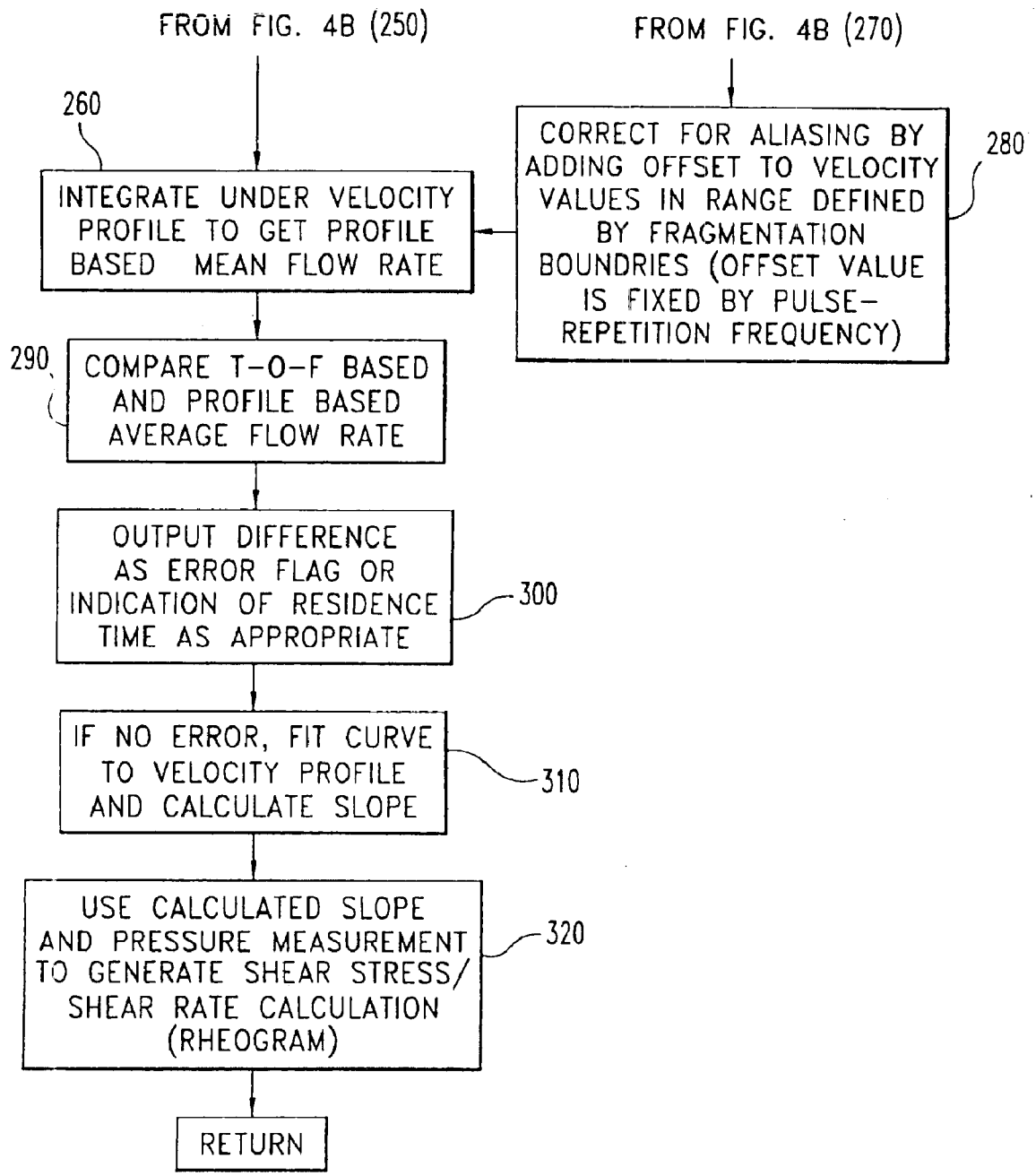

System 30 can be programmed to operate automatically according to a preset interrogation routines, performing one or more ultrasonic interrogation techniques at one or more of the frequencies, f1, f2, in a predetermined sequence. An exemplary mode of operation is given in the flow chart of FIGS. 4A–4C. After setting the system parameters, thru-transmission mode is selected and time-of-flight measurements are performed at both frequencies and in both directions in action 100. The need to adjust the gain parameters is ascertained by calculating the ratio of the transmitted amplitude to the root mean squared (RMS) amplitude and comparing the ratio for each of the frequencies to predetermined system limits in action 110. If there is a need to adjust the gain (i.e. at least one frequency is out of the prescribed limits), the ability to adjust the gain is ascertained in action 120. The slope and/or the baseline of the gain is adjusted if possible in action 140 and the time of flight measurements are repeated 100. If there is no need or further ability to adjust the gain parameters, the process continues to action 150 if the transmission amplitude for at least one of the frequencies is acceptable. It is to be understood that gain adjustments will likely occur when the properties of the fluid flow, and in particular the ultrasonic attenuation, change over time. In these situations, the present method provides a mechanism for automatically capturing meaningful data when the fluid properties are changing.

Having iteratively adjusted and set the time variable gain for future measurements, the time-of-flight data from both directions together with the pipe diameter are used to calculate the speed of sound in the fluid and a time-of-flight based mean flow rate in action 150. These values, together with the temperature, pressure and signal amplitudes, are saved in action 160.

The system switches to Doppler mode and collects Doppler data from both sides of the pipe at both frequencies in action 170. Action 180 calls for the extraction of phase and amplitude information. The signal to noise ratio of the extracted amplitudes is calculated in action 190 as a function of pipe location. If an adequate signal to noise ration is achieved fully across the pipe, the high frequency data is averaged to build the velocity profile in action 200. If not, then the range where the signal to noise ratio fails for each frequency is calculated in action 210. After determining whether or not the acceptable lower frequency range data covers at least half the pipe diameter in action 220, (with an error flag set if the condition fails) the composite profile is built in action 230. The profile is assembled from the fragments meeting the signal to noise criteria.

Having determined a velocity profile in actions 200 or 230, the slope of the profile is calculated in action 240 to search for discontinuities. If aliasing is found 250 and the pulse repetition frequency has room to be adjusted 270 (based on measured speed of sound), the PRF is increased. Otherwise, or in addition, aliasing in the current profile is corrected by adding the calculated offset values to those values outside the range defined by the fragmentation boundaries in action 280. The offset values are fixed by the pulse repetition rate and the measured speed of sound. Once corrected or if no evidence of aliasing is found 250, a velocity profile-based mean flow rate is calculated by integrating under the velocity curve in action 260.

The mean flow rates determined by the velocity profile and the time-of-flight measurements are then compared in action 290. Any difference outside of measurement error is output as either an error flag or a measure of residence time in action 300. If there is no error condition, a curve is fit to the velocity profile in action 310. The derivative of the fitted curve is then taken and combined with the measured pressure drop to yield shear stress and shear rate information in action 320.

While described above with respect to substantially continuous interrogation of fluid properties in a flowing stream (a flow-mode configuration), other operations are contemplated. For example, in the flow-mode configuration described above, the system is synchronized (for purposes of collecting the Doppler data at each frequency) by an internal electronic signal that is not necessarily tied to any external phenomena. In one variation, the system is synchronized to an external trigger, which is a trigger that has some relation to a physical phenomena bearing a relationship to the fluid. For example, when the flow is provided by a pulsating pump, the fluid flow will be time dependent based on the phase of the pumping cycle. A specific phase in the cycling of a pump to produce a fluid pulse is one example of an external trigger that can serve as the trigger for data acquisition. This is to be contrasted with collecting data over a substantially random interval throughout the variation of the fluid flow which would occur if data acquisition was not synchronzied with the pumping cycle. In this external trigger variation, the fluid is interrogated at a predetermined time(s) and predetermined frequency(ies) with respect to the period of the pulsating flow provided by the pulsating pump. In this variation, the instantaneous, synchronized velocity profile is used to extract fluid properties, including strain-stress relationships. In one application a short series of pulses are transmitted after each trigger to capture a snapshot of the velocity profile during the short time window of the short pulse series. In other applications, the velocity profile is reconstructed based on the response across a series of successive triggers, where the response from pulses at fixed intervals after successive triggers are correlated. In this latter application, the time evolution of the velocity profile relative to the triggering event can be constructed. A combination approach is also contemplated where ranges of time after successive triggering event are averaged to create the time evolution of the velocity data. Alternatively or in addition, the time evolution of the speed of sound can be tracked in similar fashion.

Similarly, a mix-mode application is contemplated where the external trigger could be a physical aspect of the mixing. For example, the transducers can be aimed or located on a fixed fluid location relative to a mixing paddle in a mixing vessel. A useful fixed location might be in the region immediately around the mixing blade when the blade is at a specified location during the blade operation. In this variation, the system can be synchronized to the motion of the mixing blade to synchronize the ultrasonic interrogation pulses with the mixing paddle reaching a predetermined location in its cycle. Accordingly a velocity profile can be developed that is a essentially a freeze frame of the flow profile relative to the paddle motion. The same approach is useful for another variation where mixing is achieved by shaking, such as with paints for one example, where the acquisition cycle can be syncronized with the onset of agitation. In the shaking example, the transducers can be mounted to the shaken vessel and/or communicate with the vessel contents through the walls of the vessel.

While the invention has been illustrated and described in detail in the drawings and foregoing description, the same is to be considered as illustrative and not restrictive in character, it being understood that only preferred embodiments have been shown and described and that all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. All publications, patents, and patent applications cited in this specification are herein incorporated by reference as if each individual publication, patent, or patent application were specifically and individually indicated to be incorporated by reference and set forth in its entirety herein. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary.

What is claimed is:

1. A method for characterizing a fluid flow comprising:
    with at least one pair of ultrasonic transducers spaced around a fluid flow, measuring first and second reflection mode pulsed wideband Dopplers of the fluid flow at first and second different ultrasonic frequencies respectively;
    selecting a first portion of the first reflection mode pulsed wideband Doppler having a determined signal to noise ratio less than a predetermined level;
    forming a data set corresponding to a composite velocity profile for the fluid flow from the selected first portion of the first Doppler and a portion of the second Doppler; and
    determining a value corresponding to a rheological property of the fluid flow from the data set and a measured pressure drop of the fluid flow.

2. The method of claim 1 further comprising measuring an ultrasonic time of flight at at least one of the first or second frequencies to determine a local speed of sound in the fluid for use in determining local fluid velocities from the Dopplers.

3. The method of claim 2 further comprising determining a change in the material of the fluid flow when the determined local speed of sound changes a predetermined amount.

4. The method of claim 1 wherein the relationship between shear stress and shear rate in the fluid is substantially non-linear and determining a rheological property includes determining a data set corresponding to the shear stress as a function of the shear rate for the fluid flow.

5. The method of claim 1 further comprising adding an offset to a portion of the data set corresponding to the composite velocity profile to correct aliasing when discontinuities in the data set are detected.

6. The method of claim 5 wherein the offset is calculated from a speed of sound in the fluid measured with the same transducers used to measure at least one of the Dopplers.

7. The method of claim 1 wherein measuring the Dopplers is performed in response to a trigger independent of variations in the fluid flow.

8. A method for characterizing a fluid flow comprising:
    providing an opposed pair of multi-frequency ultrasonic transducers around a conduit, wherein each transducer in the pair is operable to transmit a wide bandwidth coherent burst of ultrasound at first and second different ultrasonic frequencies;
    obtaining first Doppler data at the first ultrasonic frequency with each of the opposed pair of transducers for fluid flowing in the conduit;
    forming a first data set corresponding to a first velocity profile with the first Doppler data obtained at the first ultrasonic frequency, the first velocity profile spanning substantially the entire width of the conduit;
    continuing obtaining the first Doppler data at the first ultrasonic frequency;
    forming a second data set corresponding to a second velocity profile of fluid flowing in the conduit with at least a portion of second Doppler data obtained with each of the transducers at the second lower ultrasonic frequency when the signal to noise ratio for at least a portion of the first Doppler data obtained at the first ultrasonic frequency falls below a predetermined level, the second velocity profile spanning substantially the entire width of the conduit.

9. The method of claim 8 wherein the second velocity profile is a velocity profile of a non-Newtonian fluid.

10. The method of claim 8 further comprising comparing a value corresponding to an average flow rate determined from the second velocity profile with a value corresponding to an average flow rate determined from time-of-flight measurements with the transducers.

11. The method of claim 10 further comprising continuing the comparing of the values corresponding to the average flow rates and outputting a value corresponding to the comparison as an indicator of a fluid flow characteristic.

12. The method of claim 8 wherein the first and second ultrasonic frequencies are each between about 0.5 and about 5 MHz.

13. The method of claim 8 wherein each of the multi-frequency transducers include at least two substantially concentric transducer elements in a common housing.

14. The method of claim 8 further comprising, prior to obtaining the first Doppler data, measuring the detected amplitude of an ultrasound pulse transmitted across the conduit with the transducers and increasing a parameter of a programmable time variable gain used in detecting the Dopplers when the measured amplitude falls below a predetermined limit.

15. A method for monitoring the solids concentration of a fluid flow comprising:
performing a reflection mode pulsed wideband Doppler on a fluid flow containing solids at first and second different frequencies of transmitted ultrasound with an opposed pair of multi frequency ultrasonic transducers;
forming a data set corresponding to a composite velocity profile from the reflection mode pulsed wideband Dopplers;
determining at least one value corresponding to rheological property of the fluid flow from the data set and a measured pressure drop of the fluid flow, wherein the value corresponding to a rheological property provides an indication of the solids concentration of the fluid flow.

16. The method of claim 15 further comprising performing time-of-flight measurements with the transducers and comparing average flow rate values corresponding to the time-of-flight measurements with average flow rate values corresponding to the composite velocity profile to provide an indication of the residence time of the solids.

17. A system for monitoring the solids concentration of a fluid flow comprising:
an opposed pair of multi frequency ultrasonic transducers for performing a reflection mode pulsed wideband Doppler on a fluid flow containing solids at first and second different frequencies of transmitted ultrasound; and
a processing device coupled to the transducers operable to form a data set corresponding to a composite velocity profile from the reflection mode pulsed wideband Dopplers and operable to determine at least one value corresponding to rheological property of the fluid flow from the data set and a measured pressure drop of the fluid flow, wherein the value corresponding to a rheological property provides an indication of the solids concentration of the fluid flow.

18. The system of claim 17 wherein the transducers are operable to perform time-of-flight measurements and the processing device is operable to determine the local speed of sound in the fluid from the time-of-flight measurements.

19. The system of claim 18 wherein the processing device is operable to comparing average flow rate values corresponding to the time-of-flight measurements with average flow rate values corresponding to the composite velocity profile to provide an indication of the residence time of the solids.

20. A fluid processing system comprising:
a pair of opposed multi frequency ultrasonic transducers surrounding a fluid flow wherein each of the ultrasonic transducers are selectively operable to perform reflection mode pulsed wideband Dopplers at at least two distinct frequencies of transmitted ultrasound and time of flight measurements at the two frequencies; and
a processing apparatus coupled to the transducers operable to select performance of the Doppler and the time-of-flight measurements and to determine a composite velocity profile of the fluid flow from the reflection mode pulsed wideband Dopplers.

21. The system of claim 20 wherein the multi-frequency transducers include at least two substantially concentric different transducer elements for operation at the two different frequencies.

22. The system of claim 20 wherein the processing apparatus is operable to compare values corresponding to the average flow rates derived from the composite velocity profile and the time of flight measurements respectively.

23. The system of claim 20 further comprising at least one programmable time variable gain coupled to the transducers, wherein the processing apparatus is operable to reprogram the gain when a determined signal to noise ratio exceeds a predetermined limit.

24. A method of determining fluid properties comprising:
providing a pair of multifrequency transducers spaced around a fluid;
measuring a time of flight with the transducers to determine a speed of sound in the fluid; and
measuring at least one reflection mode pulsed wideband Doppler of a volume of the fluid in response to a trigger corresponding to a substantial variation in the velocity field of the volume to determine the velocity field of the fluid relative to the trigger.

25. The method of claim 24 further comprising measuring a plurality of reflection mode pulsed wideband Dopplers in response to the trigger to determine the velocity field of the fluid as a function of time after the trigger.

26. A method for characterizing a fluid flow comprising:
with at least one pair of ultrasonic transducers spaced around a fluid flow, measuring reflection mode pulsed wideband Dopplers of the fluid flow;
forming a data set corresponding to a velocity profile for the fluid flow from the Dopplers, wherein the forming includes adding an offset to a portion of the data set to correct aliasing when discontinuities are detected; and
determining a value corresponding to a rheological property of the fluid flow from the data set and a measured pressure drop of the fluid flow.

27. The method of claim 26 wherein the offset is calculated from a measured speed of sound in the fluid.

28. The method of claim 27 wherein the speed of sound is measured with the same transducers used to measure the Dopplers.

* * * * *